United States Patent
Ascua et al.

(10) Patent No.: US 9,248,995 B2
(45) Date of Patent: Feb. 2, 2016

(54) VACUUM VALVE

(71) Applicants: Carlos M. Ascua, Parana (AR); Juan Carlos de Ledebur, Miami, FL (US)

(72) Inventors: Carlos M. Ascua, Parana (AR); Juan Carlos de Ledebur, Miami, FL (US)

( * ) Notice: Subject to any disclaimer, the term of this patent is extended or adjusted under 35 U.S.C. 154(b) by 295 days.

(21) Appl. No.: 13/778,182

(22) Filed: Feb. 27, 2013

(65) Prior Publication Data

US 2014/0238781 A1    Aug. 28, 2014

(51) Int. Cl.
*B66B 9/04* (2006.01)
*F16K 7/14* (2006.01)
*B65G 51/04* (2006.01)

(52) U.S. Cl.
CPC ... *B66B 9/04* (2013.01); *F16K 7/14* (2013.01); *B65G 51/04* (2013.01); *Y10T 137/9029* (2015.04)

(58) Field of Classification Search
CPC ............... F16K 7/00; F16K 7/12; F16K 7/14; F16K 7/17; F16K 24/00; F16K 41/12; F16K 41/103; B66B 9/04; B65G 51/00; B65G 51/04
USPC .................. 406/190, 192; 137/103, 798, 907
See application file for complete search history.

(56) References Cited

U.S. PATENT DOCUMENTS

| | | | | |
|---|---|---|---|---|
| 4,284,032 A | * | 8/1981 | Moos et al. | 118/684 |
| 5,076,737 A | * | 12/1991 | Loutsch et al. | 406/183 |
| 5,583,326 A | * | 12/1996 | Sors | 187/277 |
| 6,085,873 A | * | 7/2000 | Macchi | 187/273 |
| 6,311,718 B1 | * | 11/2001 | Hafner et al. | 137/205 |
| 6,360,768 B1 | * | 3/2002 | Galler | 137/205 |

FOREIGN PATENT DOCUMENTS

| | | | | |
|---|---|---|---|---|
| DE | 4019351 A1 | * | 11/1991 | F16K 31/365 |
| EP | 264466 A1 | * | 4/1988 | F16K 51/02 |
| SU | 448326 A | * | 12/1974 | F16K 15/14 |
| SU | 457834 A1 | * | 3/1975 | F16K 7/00 |

* cited by examiner

*Primary Examiner* — William A Rivera
*Assistant Examiner* — Stefan Kruer
(74) *Attorney, Agent, or Firm* — Patent CEO; Phillip Vales

(57) ABSTRACT

A pneumatic vacuum valve is situated atop a cylinder or convenient working space utilized in conjunction with a pneumatic elevator. The vacuum valve has a coupling unit holding a diaphragm device for actuation of the diaphragm against a flow control opening. An Allen screw uses a simple regulation device to control the flow of air into a working chamber for expansion and contraction of the diaphragm device.

8 Claims, 8 Drawing Sheets

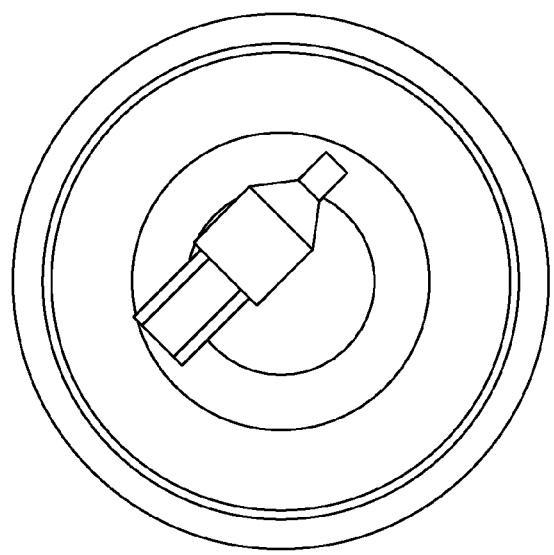
Figure 1b
110
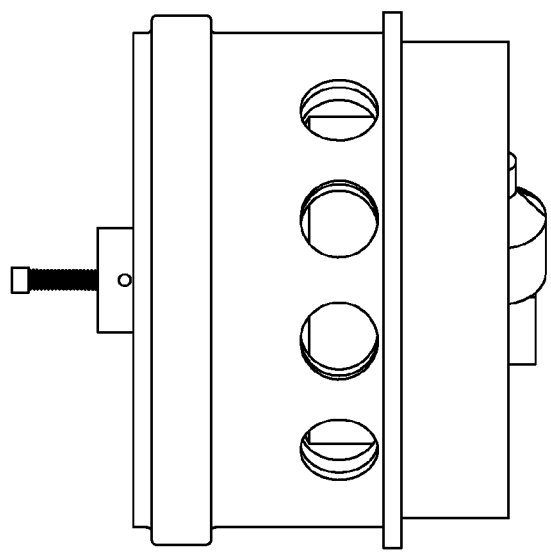
Figure 1a
100
Figure 1

Figure 2
200
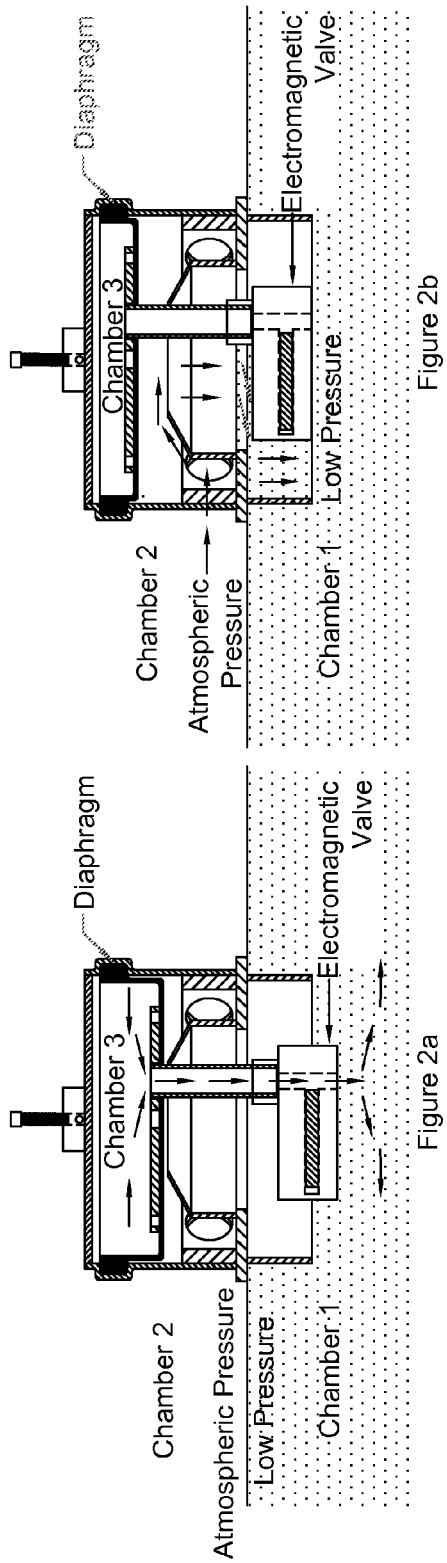
Figure 2a
Figure 2b
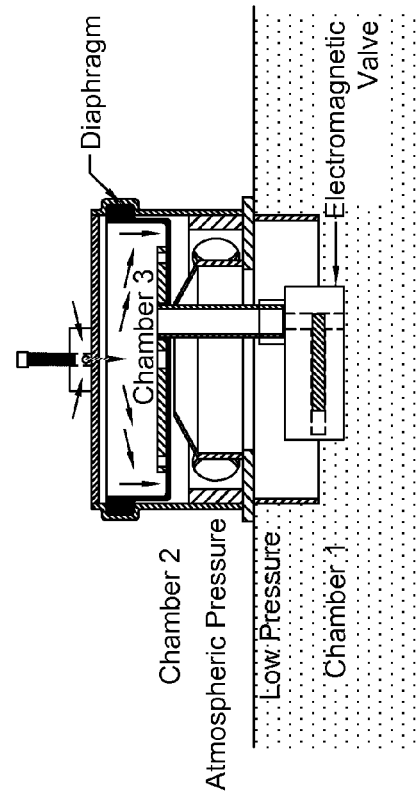
Figure 2c

A-A Section
Figure 7b1

B-B Section
Figure 7d1

VACUUM VALVE

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the United States Patent and Trademark Office patent file or records, but otherwise reserves all copyrights whatsoever.

BACKGROUND (1) Field of the Invention

Relating to improvements in controls utilized to move a pneumatic type elevator. More specifically, relating to improvements in a vacuum valve controlling the flow of air to and from chambers in order to move an elevator cabin down its tubular pathway.

Various valves have been designed to facilitate the motion of these pneumatic elevators. However, the current valves available in the marketplace absorb tremendous amounts of power in their operation. In a typical pneumatic elevator, a cabin ascends and descends within an operating cylinder. The descent of the cabin requires the system to generate a force proportionate to the air released from the orifice of the cabin multiplied by the pressure difference between the two chambers (the cabin and the operating cylinder); of course this requires a great deal of power. Currently there is no known system or mechanism that can overcome this deficiency. Thus, there needs to be some solution to this problem. Additionally, there is a need to supply a pneumatic vacuum elevator with an air valve that can be activated safely using a minimum amount of energy, and allows air flow thru an orifice thereby achieving a cabin descending speed applicable to the norms and laws of each country.

BRIEF SUMMARY OF THE INVENTION

A vacuum valve system comprising:
a pneumatic elevator cylinder having a sealed cabin therein;
a diaphragm device attached at a top of the pneumatic elevator cylinder;
a plate of material situated above the diaphragm device;
a hollow tubular member attached at an end to the plate of material such that another end of the hollow tubular member extends downwards through a perforation of the diaphragm device into the elevator cylinder; and
an electromagnetic switch attached to a bottom of the hollow tubular member.

A vacuum valve system, comprising:
a pneumatic elevator cylinder having a sealed cabin therein;
a diaphragm device attached at a top of the pneumatic elevator cylinder;
a coupling unit within which the diaphragm device is situated;
a cap attached to the coupling unit; and
a regulation member attached to a top surface of the cap.

In another aspect, wherein the regulation member further comprises:
a passageway from a side of the regulation member to a bottom side of the regulation member.

In another aspect, wherein the regulation member further comprises:
a hole at a top of the regulation member intersecting the passageway.

In another aspect, wherein the regulation member further comprises:
an adjustment member inserted in the hole.

A vacuum valve apparatus comprising:
a coupling unit having a top portion, a bottom portion, and a holding portion there between;
a diaphragm unit situated within a depression in the holding portion;
a cap attached to the top portion of the coupling unit;
a connection portion attached to the bottom portion of the coupling unit wherein the connection portion is also attached to a pneumatic elevator cylinder;
a sealing unit attached to a top region of the connection portion;
a plate of material situated above the diaphragm unit; and
a control member attached to the plate of material through a perforation in the diaphragm unit.

In another aspect, wherein the vacuum valve apparatus further comprises:
a regulation member attached to the cap.

In another aspect, wherein the control member further comprises:
an electromagnetic switch.

BRIEF DESCRIPTION OF THE SEVERAL VIEWS OF THE DRAWINGS

FIG. 1a illustrates a side view 100 of a vacuum valve of an embodiment.

FIG. 1b illustrates a bottom view 110 of a vacuum valve of an embodiment.

FIG. 2 illustrates a cross section view of an embodiment of a vacuum valve showing the direction of airflow when the valve is cycled for descent.

FIGS. 6A1 to 6F2 illustrates various component parts describing novel features thereof in an embodiment of the teachings herein.

FIGS. 7A1 to 7F2 illustrates various component parts describing novel features thereof in an embodiment of the teachings herein.

DETAILED DESCRIPTION OF THE INVENTION

Figure 3:
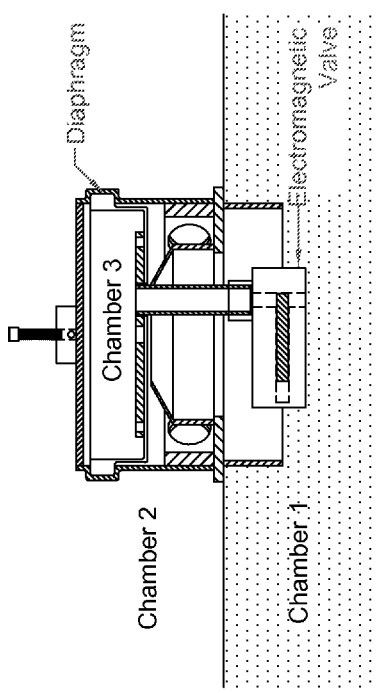
FIG. 3 illustrates a cross section view of an embodiment of a vacuum valve showing the closure of the same for stopping of the cabin.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in each figure. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The vacuum valve herein described allows air flow to go thru two chambers at different pressures utilizing a simple device whilst simultaneously minimizing electric consumption. As the device is to be utilized in an elevator it is preferably located on the top of a cylinder thereof or near turbine motors; in this location it is configured to act as a regulator for cabin descent speed. This regulation occurs through the use of an opening between the two chambers with different pressure there between.

FIG. 1a illustrates a side view 100 of a vacuum valve of an embodiment showing various novelties described further below. FIG. 1b illustrates a bottom view 110 of a vacuum valve of an embodiment showing various novelties described further below. The parts described herein described are all adhesively connected unless otherwise indicated.

FIG. 2 illustrates a cross section view of an embodiment of a vacuum valve showing the direction of airflow when the valve is to be opened so that cabin can descend inside of an elevator cylinder. It should be appreciated that the elevator cylinder (chamber 1) is already at a lower pressure than the atmospheric pressure present externally about the elevator cylinder (chamber 2) or the pressure in the diaphragm (chamber 3) at the commencement of this drawing. When the cabin receives the order to descend, the elevator controller sends a signal to the electromagnetic valve; this switches the electromagnetic valve to an open position as shown in FIG. 2a. Further, the vacuum pressure inside the cylinder (chamber 1) goes thru the electromagnetic valve and doubly threaded cylinder to the upper part of the diaphragm making it compress toward the upper portion of the diaphragm valve chamber formed by the cap and diaphragm; in other words, the air flows out of the diaphragm chamber 3 to the low pressure chamber 1. As a consequence of this, the top part of the PVC reducer orifice is opened and allows air to flow into the cylinder (from chamber 2 to chamber 1) as shown in FIG. 2b, releasing the low pressure and allowing the cabin to descend. Thus, the ultimate end of the opening of the electromagnetic valve is to permit air to flow from the atmosphere (chamber 2) into the perforations or holes in the side of the coupling unit through the reducer and the other parts and on into the elevator cylinder (chamber 1) thereby permitting the cabin to descend. FIG. 2c illustrates how when a signal is given to close the electromagnetic valve no air can flow through the sides of the coupling unit through the reducer unit and into the diaphragm working region (chamber 3); it can be appreciated that the working region (chamber 3) has been left at a low pressure as a result of the action in FIGS. 2a-2b such that the action of the regulation member now comes into play. It is situated at the top of the cap having a passageway for air flow that is filled partially with an Allen screw; air is sucked through this passageway forcing the diaphragm to close and stop the motion of the elevator.

FIG. 3 illustrates a cross section view 300 of an embodiment of a vacuum valve showing the closure of the same. In order to allow the cabin (not shown) to stop inside of the elevator cylinder (not shown) low pressure is created inside of the elevator cylinder via the use of turbine motors which remove air from the same; in this manner, the low pressure can overcome the cabin weight facilitating the cabin's ascent. At the moment that the electromagnetic valve is closed (FIG. 3), the upper part of the valve (chamber 3) is exposed to the atmospheric pressure, and the lower part (chamber 1) to the low pressure inside the cylinder as consequence of the air extraction. This pressure difference makes the diaphragm hermetically closed sealing the reducer orifice. This process happens when the elevator cabin traveling inside of an elevator cylinder is about 20 cm away from the floor level; as it passes by a position reed sensor this causes the electromagnetic solenoid valve to close. As a result, the diaphragm returns to its original extended position shown in (FIG. 3) due to the diaphragms own weight, the extra weight of the steel disk, the closure of the electromagnetic solenoid valve and the square device that allows the air flow to the upper part of the diaphragm. Without this air flow, the diaphragm would remain in its open position preventing any possibility of stopping before ascension; also, since it would not return to its original position it would not close the area between the PVC reducer and diaphragm. Finally, the function of the Allen screw located on the square device is to regulate the air flow on top of the diaphragm, to achieve that air enters into chamber 3 causing the diaphragm to close at a desired rate before the cabin reaches the floor landing. Further this softens the landing of the cabin.

Figure 4:
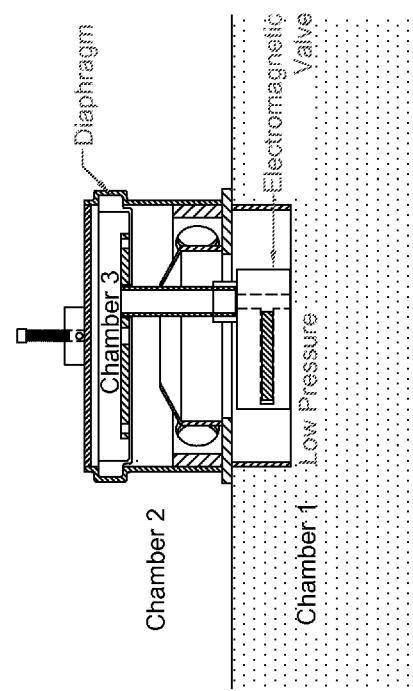
FIG. 4 illustrates a cross section view of an embodiment of a vacuum valve showing the valve being opened without airflow lines.

FIG. 4 illustrates a cross section view of an embodiment of a vacuum valve showing the valve being opened without airflow lines.

Figure 5:
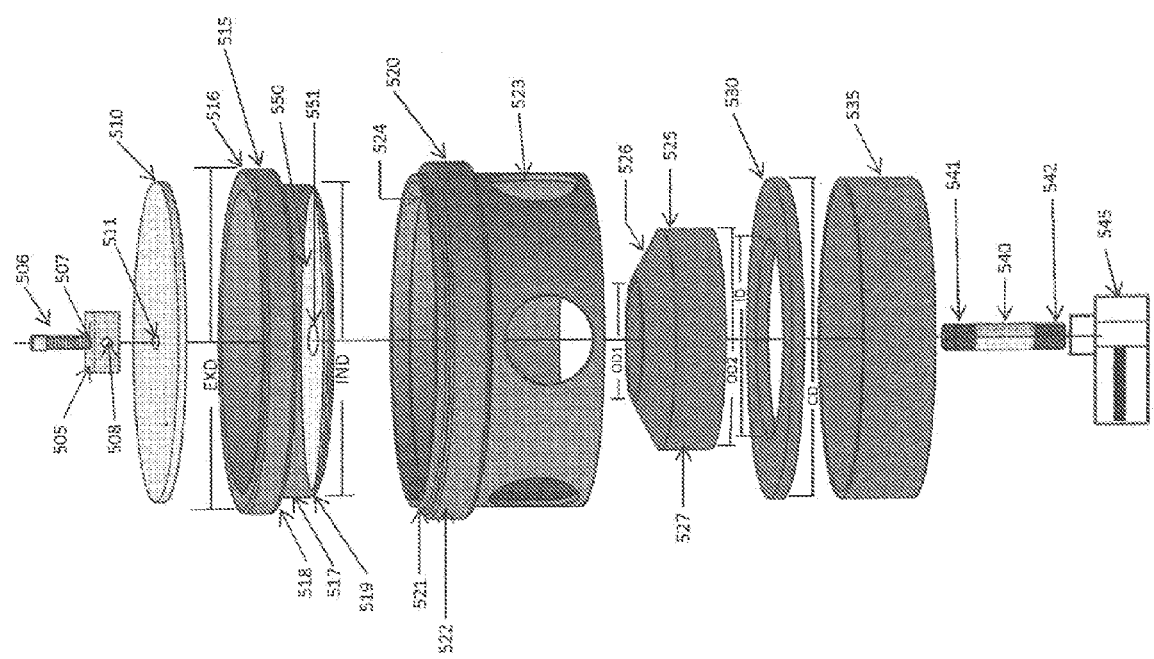
FIG. 5 illustrates a front isometric view of an embodiment of the component parts that comprise the vacuum valve.

FIG. 5 illustrates a front isometric view 500 of an embodiment of the component parts that comprise the vacuum valve. The vacuum valve of the instant embodiment comprises eleven primary components: Allen screw 506, square air orifice device 505, a polycarbonate cap 510, a rubber diaphragm 515, a plastic or metallic coupling 520, a PVC reducer 525, a round disk annulus 530, a PVC cylinder 535, a hollow double threaded cylinder 540, a screwed on solenoid valve 545 and a steel plate 550.

At the top of the device there is a square piece of material 505 forming a device that allows the air to enter into chamber 3 in FIGS. 1-4; the square device is made from plastic or similar material. The square device has a ¼×1¼×⅞ Allen threaded screw 506 inserted at its top through a corresponding threaded hole 507, which regulates an orifice 508 on the device; by turning the screw one direction or the other more or less air can be permitted entry into chamber 3 in FIGS. 1-4. The square device is glued to the top of a polycarbonate cap whereby the orifice 508 is connected to a passageway linking the hole 507 and a bottom passageway to a bottom hole on the device (not shown in this figure, see FIG. 6c, 6f) that connects to a hole 511 on the polycarbonate cap 510.

This polycarbonate cap 510 is a round disk 160 mm diameter by 4 mm thickness having a hole 511 at its center. This hole permits air to flow in from the square device's passageway 508 as the rectangular device is glued above this hole 511 so as to center the hole 511 directly underneath the bottom hole connected by passageways to the orifice 508. This cap is attached at its circumferential edge and sealed to the coupling unit 520 at the inner lip of the short cylindrical portion 521 with silicone, glue or similar adhesives thus forming a diaphragm working chamber (3).

A rubber diaphragm 515 is composed of three main integral portions: an upper ring 516 having an opening therethrough and a lower portion 517 closed to form the diaphragm actuation region and a bottom disk 519. The upper ring portion 516 is a circular material of larger external diameter EXD than the lower portion 517 so that this upper ring portion fits into a matching depression in coupling 520; the upper ring portion also has an inner diameter IND that matches that of the lower portion 517. The lower portion 517 and the upper ring portion 516 are one integral component where the bottom edge 518 of the upper ring portion meets the circumferential external surface of the lower portion 517. The lower portion extends downwards in the drawing and then is closed by a round disk 519 that meets the downwards edge of the lower portion 517. This round disk 519 forms the actuation region of the diaphragm/diaphragm closure device. Additionally, the diaphragm has a perforation P formed in the drawing to permit the insertion of a top of a double threaded screw 540 for screwing into the steel plate 550. Of course, the upper portion 516 can optionally be adhesively attached to the aforementioned inner diaphragm insertion portion 522 whilst the bottom portion 517 is left without adhesive attachment so that it can perform the main actuation motion of the system.

A coupling 520 is made from PVC, plastics, metals or similar suitable materials. The coupling is comprised of three main integral portions: a short cylindrical portion 521, a cylindrical diaphragm insertion portion 522 and a large cylindrical barrel portion 523. The short cylindrical portion 521 extends upwards in the drawing a short distance and interfaces at its lowest portion with a cylindrical diaphragm insertion portion 522 that has a larger external diameter and larger internal diameter than either the short cylindrical portion 521 or large cylindrical barrel portion 523. Because of the differences in sizes the cylindrical diaphragm insertion portion 522 is shaped such that there is a convenient insertion depression 524 running along the inner circumferential region of the cylindrical diaphragm insertion portion 522. Here the top portion 516 of the diaphragm 515 can be inserted to permit activation of the diaphragm like device.

A PVC reducer 525 is made of integral top 526 and bottom portions 527. The top portion is a hollow conical portion that is of smaller outer diameter OD1 at the top of the device and gradually grows to a larger outer diameter OD2 at the interface with the bottom portion 527. The bottom portion proceeds downwards in the drawing with the same diameter as the interface OD2 forming a cylindrical portion 527. The outer and inner diameters of the bottom portion of the reducer 525 are of such sizes that the bottom portion 527 of the device sits atop a round annulus disk 530 having been adhesively attached (welded or heat treated if made of other materials such as metals or other plastics).

Around annulus disk 530 is made of PVC, plastics, metals or similar suitable materials. It has an inner and outer diameter in the drawing denoted ID and OD. The OD is larger then the bottom external diameter of the coupling 520 and the ID is smaller than the bottom inner diameter of the coupling 520; thus, these dimensions permit the adhesive (or heat or welding) attachment of the bottom of the coupling 520 to the round annulus disk 530 so that the aforementioned sits atop the round annulus disk 530.

A PVC cylinder 535 is of such a size that it can be attached (adhesively or heat or welding depending on materials utilized) to the bottom portion of round annulus 530. It is attached between the inner and outer diameters of the round annulus permitting air to flow through the cylinder 535 and through the passageway in the annulus 530, reducer 525 and through the holes in the coupling 520.

A hollow double threaded cylinder 540 has a top external thread 541 and a bottom external thread 542 that is attached to a screw-on solenoid valve 545. The top external thread 541 is attached to a threaded hole 551 in steel plate 550. Of course to get to the steel plate 550 there is a perforation in the rubber diaphragm that permits the entry of the top external thread 541 of the double threaded cylinder 540. The double threaded cylinder 540 passes through the opening in cylinder 535, through the passageway in the annulus 530, through the hollow reducer 525 and through the diaphragm 515 perforation and into plate 550.

A screwed on solenoid valve 545 to the threaded cylinder 540 is what the elevator controller powers on or off. The solenoid valve 545 when powered on allows air from chamber 3 to enter into chamber 1. This action causes the diaphragm 515 and the steel plate 550 to raise upward allowing the vacuum valve to open and air to flow from chamber 2 to chamber 1.

Implementation: One implementation of the embodiments described herein has the following specifications. The differential vacuum valve diaphragm system is composed from the following: a diaphragm that is made from a flexible piece of rubber and a 1.6 mm thick metal disc with perforations decreasing the weight of the metal and to allow the diaphragm to rise. The purpose for placing the metal disc inside the rubber piece is to achieve a good seal as it closes by the use of its rigidity and weight against the top of the reducing component. The vacuum valve attached to this diaphragm is a ½"×6 cm PVC pipe, which has a normally closed electromagnetic solenoid valve. This valve receives an electrical signal that switches to an open position allowing the air flow between both sides of the diaphragm; this permits pressure to transfer from chamber 1 to chamber 3.

The diaphragm is located inside a 160 mm coupling and sits atop a PVC reducer from 110 mm to 63 mm. This reducer is placed on top of a polycarbonate round plate 100 mm interior diameter, 80 mm width, and 6 mm thickness. The coupling is located between the exterior and interior diameters of the round plate; the assembly of the reducer and the diaphragm will be located inside the coupling as described previously above. On the opposite side of the round plate a PVC pipe of 160 mm diameter and 36 mm length is attached so as to gain entry into chamber 1 that is the inside of hoist way/cylinder in which the cabin of elevator travels. Thus, this pipe is the joining section between the valve and the elevator that is fit into a hole in the top of the elevator or near turbine motors. The vacuum valve is adhered on to elevator with glue, adhesives or other attachments depending on implementation details (screws, welding etcetera). Next, located over the coupling and the diaphragm is a polycarbonate cap 160 mm diameter by 4 mm thickness. This cap is attached and sealed to the coupling unit of the diaphragm such that the polycarbonate cap is adhered to the inner lip of the coupling with silicone in such a way that the diaphragm forms a chamber 3. Over the coupling and the diaphragm a polycarbonate cap 160 mm diameter by 4 mm thickness is located. On top of the cap a square device is located that allows the air to enter into the diaphragm actuation chamber through a hole in the cap. The square device has a ¼×1.25×⅞ Allen screw attached at a hole in the top of the square device, which regulates an orifice on the device from the outside air through passageways within the square device to a bottom hole on the square device to a hole in the cap therefore regulating the air intake into the diaphragm actuation chamber (3).

Figure 6:
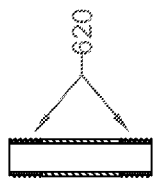
Figure 6:
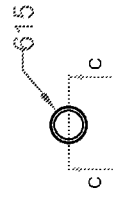
Figure 6:
Figure 6:
Figure 6:
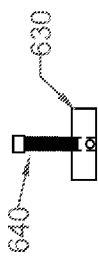
Figure 6:
Figure 6:
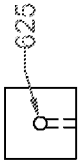
Figure 6:
Figure 6:
Figure 6:
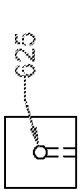
Figure 6:
Figure 6:
Figure 6:

FIG. 6 are several drawings 600 illustrating various component parts describing novel features thereof in an embodiment of the teachings herein. FIG. 6a illustrates a disk 605 having various perforations 611 that help to appropriately weigh the disk 605 inside of the diaphragm; the disk 605 also has a threaded hole 610 that matches the threading on an inserted hollow cylinder shown in FIG. 6b. FIG. 6b illustrates a double threaded 620 hollow cylinder 615 that is inserted into the threaded hole 610 of FIG. 6a through a hole in the diaphragm and to solenoid valve 650. FIG. 6c illustrates a square piece of material 630 having a two leg passageway; one leg runs along the bottom of the piece starting at one side 635 of the piece and ends approximately halfway therethrough; the other leg of the passageway is perpendicular to the first and runs from the top middle of the piece 625 down almost to the bottom of the piece where it meets the first leg (from the top to this juncture is optionally threaded for the Allen Screw or relies on forced threading with a larger screw than the inner walls of the hole), goes past it and opens a third opening at the bottom of the piece directly opposite the other opening of this leg at the top of the piece. FIG. 6d illustrates a screw on solenoid valve 650 having a solenoid (not shown) activated arm 653 that actuates to open and close a passageway 652 that extends from the top near the threaded hollow chamber 651 of the device 650 to the bottom thereof; this hollow threaded chamber 651 that meets this passageway 652 at its top is utilized to screw on the bottom threads of double threaded 620 hollow cylinder 615. FIG. 6e illustrates an Allen Screw 640 from side and top views. FIG. 6f illustrates the Allen Screw 640 inserted in the square piece of material 630 (it is not glued as this would impede the action of adjusting of the screw for air intake).

Figure 7:
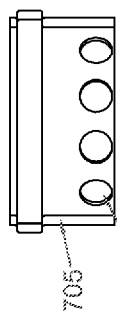
Figure 7:
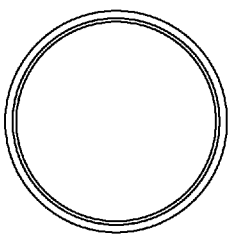
Figure 7:
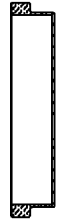
Figure 7:
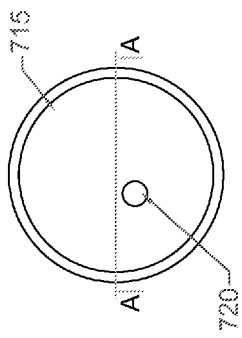
Figure 7:
Figure 7:
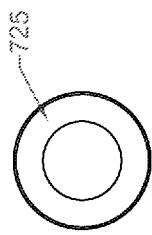
Figure 7:
Figure 7:
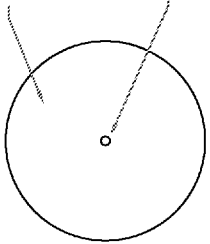
Figure 7:
Figure 7:
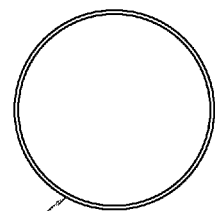
Figure 7:
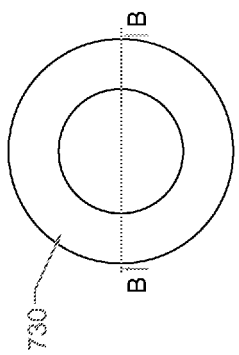

FIG. 7 illustrates various component parts describing novel features thereof in an embodiment of the teachings herein. FIG. 7a illustrates a cross section and a top view of a cylindrical coupling unit 705 having round cavities 710 that extend through its lower portion. FIG. 7b illustrates a cross section and a top view of a round diaphragm 715 having a hole 720 perforating a portion thereof so as to permit entry of a threaded screw that attaches to a disk. FIG. 7c illustrates a cross section and a top view of a round reducer device 725 having a top conical portion that provides the reducing effect integrated with a bottom cylindrical portion. FIG. 7d illustrates a cross section and a top view of an annulus 730 for attachment of the bottom of the reducer unit 725 and the coupling unit 705. FIG. 7e illustrates a cross section and a top view of a cylinder used inside of the cylinder compartment. FIG. 7f illustrates a cross section and a top view of a cap 740 illustrating a hole 745 matching a hole in the bottom of the square piece of material 630 shown in FIG. 6c.

Figure 8:
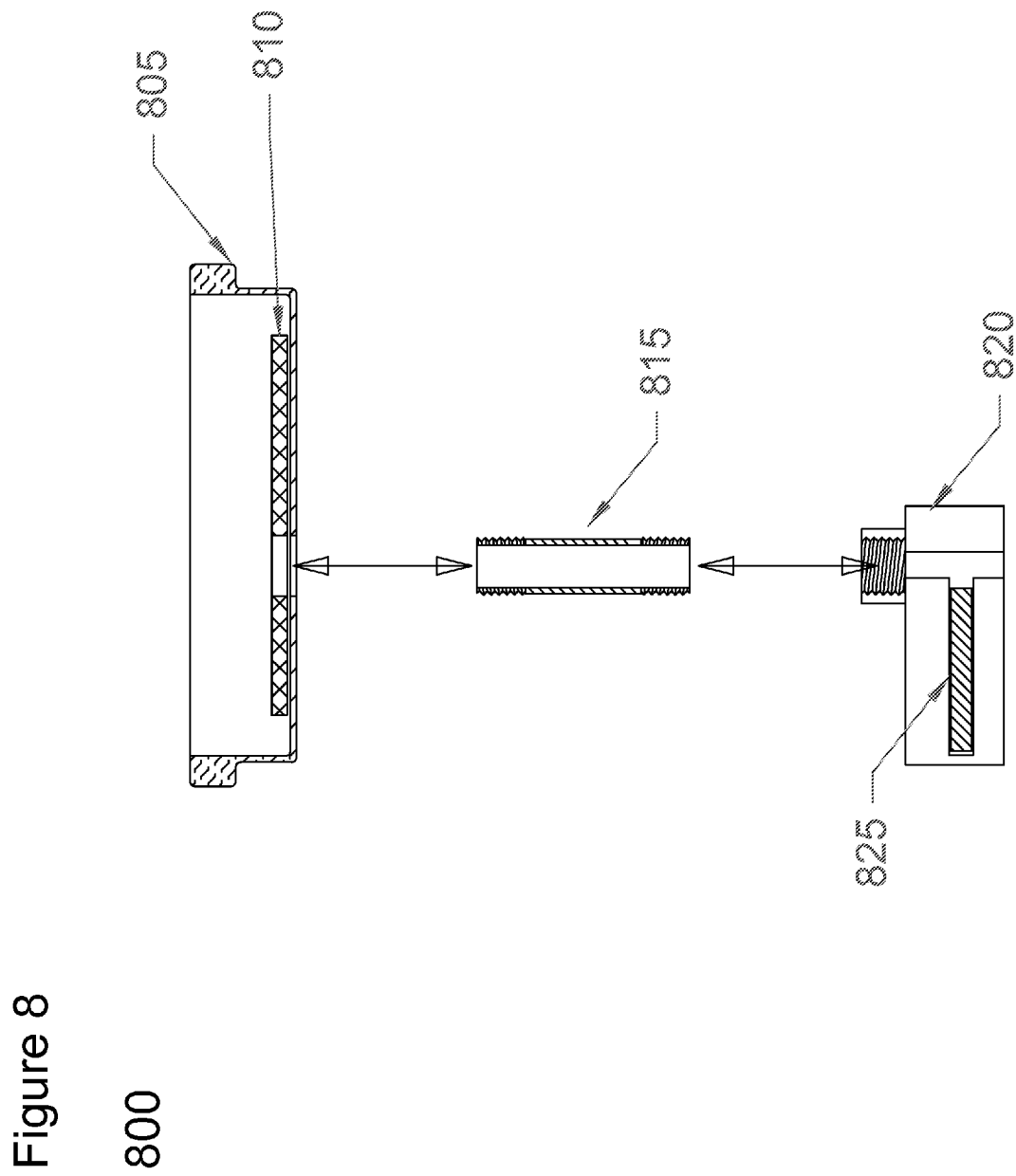
FIG. 8 illustrates how the diaphragm device is connected to an electromagnetic valve.

FIG. 8 illustrates a diaphragm device 805 shaped generally as a cylinder having only one open side; it also has a top portion extending further outwards radially than a bottom portion. The top portion having an opening therein and the bottom opposite end filled with material integral with the cylindrical sides forming the bottom portion of the diaphragm device. This bottom portion has a hole therein as shown in FIG. 8 and in FIG. 7b (720) for insertion of the top of a doubly threaded cylinder 815. Sitting atop the bottom interior portion of the diaphragm 805 is an adhesively attached disk (FIG. 6a 605) 810 for attachment of the top exterior thread of doubly threaded cylinder 815 that is screwed on through the hole (FIG. 7b 720) in the diaphragm onto the hole (FIG. 6a 610) in the disk 810. Finally, FIG. 8 shows the hollow threaded portion of electromagnetic solenoid (not shown) actuated valve 820 arm that opens and closes to control the passage of air therethrough. This off the shelf device is screwed on to the bottom external threads of the double threaded cylinder 815. A solenoid arm 825 opens and closes the passageway within the valve 820 for passage of air.

Figure 9:
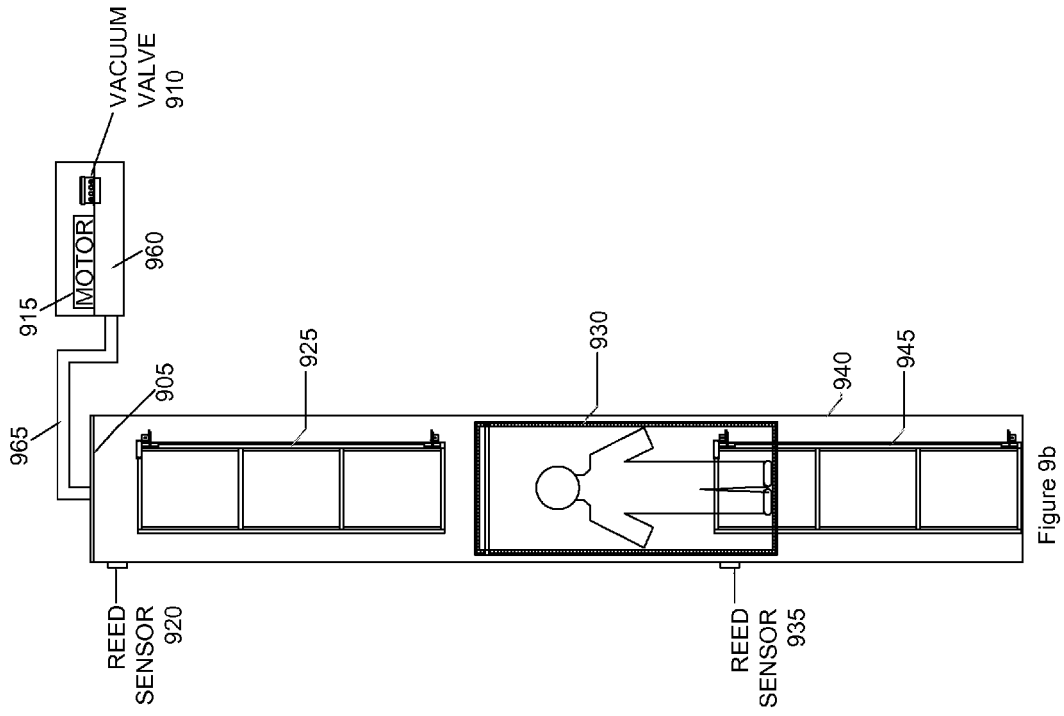
FIG. 9 illustrates an overall system view incorporating the novel features herein described.
Figure 9:
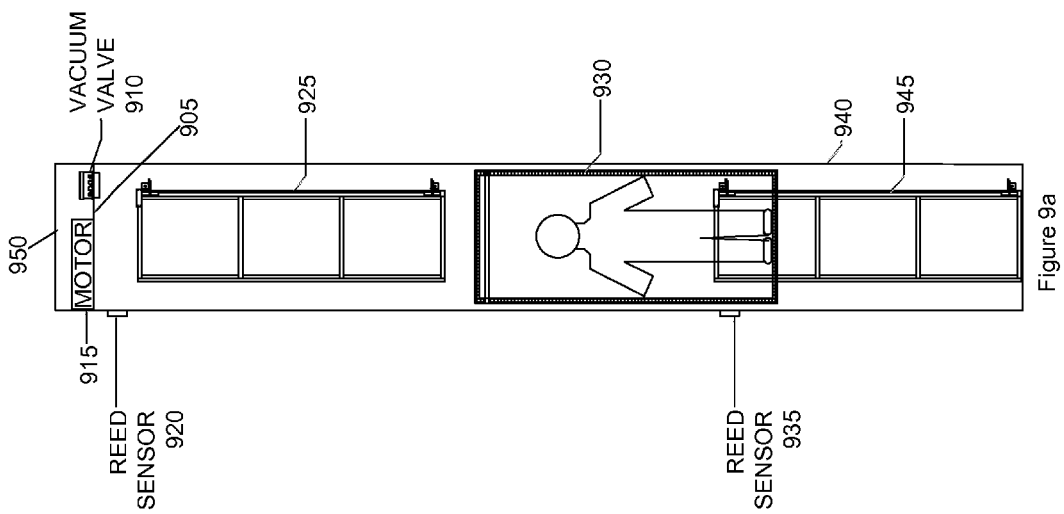

FIG. 9 illustrates an overall system view 900 incorporating the novel features herein described. FIG. 9a-9b illustrates a cabin 930 that ascends and descends within a cylinder 940 using pneumatic vacuum principles. Two doors (an upper one 925 and a lower one 945) attached to a cylinder permit the entry and exit of persons from the cabin 930 within the cylinder. Regulating the stoppage of the cabin within the cylinder are two Reed Sensors, an upper sensor 920 and a lower sensor 935, that are conveniently attached and located to the outside of the cylinder by adhesives. A motor 915 is attached to the top of a metal plate forming the top of cylinder 940. This turbine motor 915 controls the flow of air to create a low pressure condition inside of the cabin through the use of piping from the motor to the cabin. Finally, a vacuum valve 910 is situated at the top of FIG. 9a whereby the annulus previously described is affixed through adhesives to the top of the metal plate forming the top of the cylinder and the flow PVC cylinder attached to the bottom of the annulus penetrates the top of the cylinder. It can be appreciated from the figure that item 950 is a decorative barrier designed to shield observation of the motor and vacuum valve sitting at the top of the cylinder. FIG. 9b illustrates a vacuum valve 910 sitting atop a ledge on a wall 960, on the floor, on the roof of a home or similar implementation. This ledge forms a stable box or container whereby piping 965 can be attached so as to facilitate the control of air into the cylinder.

Thus has been described the main function of the vacuum valve that is to allow air flow from the chamber 2 to chamber 1, in such a way that it releases the vacuum pressure from chamber 1 and allows the cabin to descend; the air volume that enters determines the rate the cabin will descend. The device has an orifice opening that lets the air flow between the outside atmosphere and diaphragm working chamber 3 ; the amount of the orifice that is covered or opened by the Allen Screw in the rectangular part at the top of the vacuum valve, determines the descending speed of the cabin.

The instant invention has been shown and described herein in what is considered to be the most practical and preferred embodiment. It is recognized, however, that departures may be made therefrom within the scope of the invention and that numerous modifications may be made that would be within the bounds defined by the following claims.

We claim:
1. A vacuum valve system comprising:
 a pneumatic elevator cylinder having a sealed cabin therein;
 a diaphragm device attached at a top of the pneumatic elevator cylinder;
 a plate of material situated above the diaphragm device;
 a hollow tubular member attached at an end to the plate of material such that another end of the hollow tubular member extends downwards through a perforation of the diaphragm device into the elevator cylinder; and
 an electromagnetic switch attached to a bottom of the hollow tubular member.

2. A vacuum valve system, comprising:
a pneumatic elevator cylinder having a sealed cabin therein;
a diaphragm device attached at a top of the pneumatic elevator cylinder;
a coupling unit within which the diaphragm device is situated;
a cap attached to the coupling unit; and
a regulation member attached to a top surface of the cap.

3. The vacuum valve system of claim 2 wherein the regulation member further comprises:
a passageway from a side of the regulation member to a bottom side of the regulation member.

4. The vacuum valve system of claim 3 wherein the regulation member further comprises:
a hole at a top of the regulation member intersecting the passageway.

5. The vacuum valve system of claim 4, wherein the regulation member further comprises:
an adjustment member inserted in the hole.

6. A vacuum valve apparatus comprising:
a coupling unit having a top portion, a bottom portion, and a holding portion there between;
a diaphragm unit situated within a depression in the holding portion;
a cap attached to the top portion of the coupling unit;
a connection portion attached to the bottom portion of the coupling unit wherein the connection portion is also attached to a pneumatic elevator cylinder;
a sealing unit attached to a top region of the connection portion;
a plate of material situated above the diaphragm unit; and
a control member attached to the plate of material through a perforation in the diaphragm unit.

7. The vacuum valve apparatus of claim 6, further comprising:
a regulation member attached to the cap.

8. The vacuum valve apparatus of claim 6, wherein the control member further comprises an electromagnetic switch.

* * * * *